United States Patent [19]

Yoda

[11] Patent Number: 5,677,680
[45] Date of Patent: Oct. 14, 1997

[54] TRANSMITTING AND RECEIVING-APPARATUS FOR VEHICLE, HAVING MODE SETTING MEANS

[75] Inventor: Kiyoshi Yoda, Kakuda, Japan

[73] Assignee: Alps Electric Co., Ltd., Tokyo, Japan

[21] Appl. No.: 273,299

[22] Filed: Jul. 11, 1994

Related U.S. Application Data

[63] Continuation-in-part of Ser. No. 55,175, Apr. 27, 1993, abandoned.

[30] Foreign Application Priority Data

May 7, 1992  [JP]  Japan ................... 4-142251

[51] Int. Cl.⁶ .................................................. H04Q 1/00
[52] U.S. Cl. ................... 340/825.57; 340/825.31; 340/426; 307/10.1
[58] Field of Search ............... 340/825.31, 825.34, 340/825.57, 426, 427; 307/10.1

[56] References Cited

U.S. PATENT DOCUMENTS

| | | |
|---|---|---|
| 4,383,242 | 5/1983 | Sassover .................. 340/825.31 |
| 4,791,280 | 12/1988 | O'Connell ................. 340/825.31 |
| 5,109,221 | 4/1992 | Lambropoulos et al. ......... 340/825.31 |
| 5,140,317 | 8/1992 | Hyatt et al. . |

*Primary Examiner*—Brian Zimmerman
*Attorney, Agent, or Firm*—Guy W. Shoup; Patrick T. Bever

[57] ABSTRACT

A security apparatus for a vehicle including a transmitting device and a receiving device either of which is mounted on the vehicle, the security apparatus including a control section for altering a processing mode of one of the transmitting device and the receiving device when an operation switch mounted on the vehicle is operated in an abnormal fashion. The operation switch may be a radio ON/OFF switch or an ignition switch, and the abnormal operation may be turning on and off the switch a predetermined number of times within a predetermined period. When this abnormal operation is detected by the control section, the control section permits the identification code of the security apparatus to be rewritten with a new identification code transmitted from the other of the transmitting device and the receiving device.

8 Claims, 7 Drawing Sheets

TRANSMITTING AND RECEIVING-APPARATUS FOR VEHICLE, HAVING MODE SETTING MEANS

RELATED APPLICATIONS

This is a continuation-in-part of U.S. patent application Ser. No. 08,055,175, filed Apr. 27, 1993 now abandoned.

BACKGROUND OF THE INVENTION

1. Field of the Invention

The present invention relates to a transmitting and receiving apparatus for a vehicle which allows the user to operate various driving portions in the vehicle on the basis of the information the user transmits from outside the vehicle or to transmit a special processing signal from within the vehicle. More particularly, the present invention relates to a transmitting and receiving apparatus having mode setting means which enables various modes, including rewriting of an identification code and initialization, to be set by a simple operation.

2. Description of the Related Art

Transmitting and receiving apparatuses, which are available in recent years, include a portable transmitting, device carried by the user of an automobile or the like, a receiving device mounted in the automobile for receiving information transmitted from the transmitting device, and a processing device mounted in the automobile for executing a preset operation according to the information received by the receiving device.

The information to be transmitted from the transmitting device is made up of identification code information used to check a correspondence between the transmitting device and the receiving device and operation information representing, for example, locking or unlocking of a door of the automobile.

In the system arranged in the manner described above, only when the coincidence of the identification information has been confirmed on either the transmitting or receiving side, the operation corresponding to the received operation information, such as locking or unlocking the door, is carried out on the receiving side in order to insure security.

In such a system, the user may lose the transmitting device alone. In that case, since there is the possibility that the transmitting device is stolen and abused, measures must be taken without delay, e.g., the identification code of the receiving device mounted on the automobile must be modified or the receiving device must be set such that it cannot receive the information transmitted from the lost transmitting device.

To perform the above modification or setting, the user must buy both a new transmitting device and a new receiving device from a repair shop or a dealer and have them replace the receiving device with the newly purchased receiving device whose identification number coincides with that of the new transmitting device. Alternatively, the user must buy a new transmitting device from the repair shop or the dealer and have them modify the identification number of the receiving device such that it coincides with that of the new transmitting device.

However, it takes a lot of time to replace the receiving device and replacement of the receiving device increases cost. Rewriting the identification code stored in, for example, a ROM with a new identification code costs less when compared with the replacement of the receiving device but requires a personal computer and peripheral devices. In addition, the replacement work is troublesome. In either case, the working time is necessary and cost is increased.

In a transmitting and receiving system for a vehicle of the type other than the above-described one, modification of the identification code or any of the set modes requires a similar replacing operation of the storage device or a sophisticated processing work using a personal computer or the like, as in the above-described system, thus making the modification work a troublesome one.

SUMMARY OF THE INVENTION

It is an object of the present invention to provide a transmitting and receiving apparatus for a vehicle, having mode setting means, which enables an identification mode to be modified or various modes to be set without requiring a troublesome operation.

The present invention provides a transmitting and receiving apparatus for a vehicle, including a transmitting device and a receiving device either of which is mounted on the vehicle, which comprises mode setting means designed to modify either the processing mode of either the transmitting or the receiving when the user operates an operation switch mounted on the vehicle in a way different from the usual operation.

In a preferred form, when the user operates, for example, the operation switch in a way different from usual, the mode setting means can set either the transmitting device or the receiving device in an identification code rewriting mode in which an identification code (ID code) can be rewritten.

In the above means, when the user operates the operation switch mounted on the vehicle in a way different from an usual way, e.g., when the user turns on and off a radio switch, a light switch or an ignition switch mounted on the vehicle a predetermined number of times, the processing mode of the transmitting device or the receiving device mounted on the vehicle is changed. The processing mode may be an identification code rewriting mode in which the previously stored identification code is rewritten by key input operation or by reception of a new identification code in the case of the receiving device.

Other objects and features of the invention will be more fully understood from the following detailed description and appended claims when taken with the accompanying drawings.

PREFERRED EMBODIMENT OF THE PRESENT INVENTION

A first preferred embodiment of the present invention will be described with reference to FIGS. 1 to 8.

Figure 1:
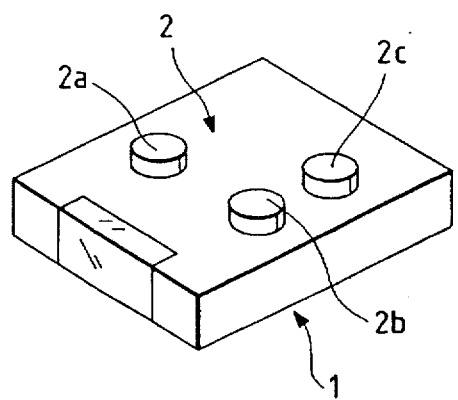
FIG. 1 is a perspective view of a transmitting device of a first embodiment of a transmitting and receiving apparatus for a vehicle, used when the user of the vehicle operates various driving portions of the vehicle on a site remote from the vehicle, according to the present invention.

Referring first to FIG. 1, a portable transmitting device 1 has a size as small as a key holder which allows the user to readily carry from one place to another. An operating section 2 is provided on an upper surface of the transmitting device 1.

Figure 2:
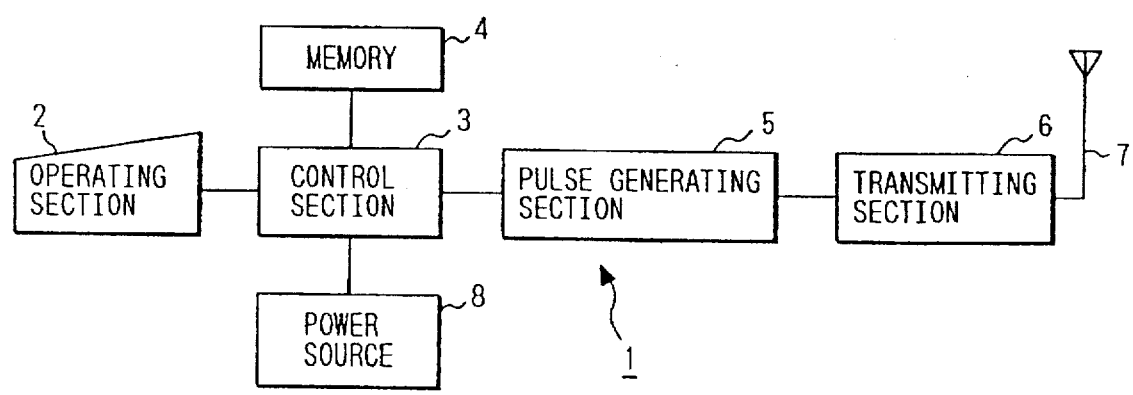
FIG. 2 is a block diagram illustrating the circuit configuration of the transmitting device shown in FIG. 1.
Figure 3:
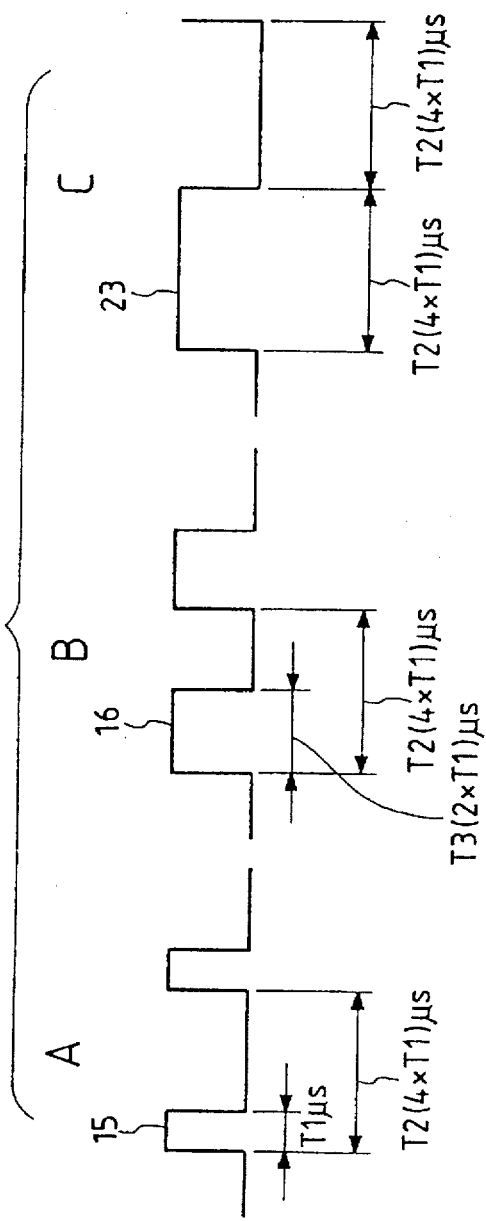
FIG. 3 illustrates the waveforms of the pulses generated by a pulse generating portion shown in FIG. 2.

The operating section 2 has three operating buttons 2a, 2b and 2c. As shown in FIG. 2, the transmitting device 1 contains a control section 3 primarily composed of a CPU (central processing unit) which performs control over the transmitting device, a memory 4, such as a RAM (random access memory), for storing operation signals respectively corresponding to the operations of the operating buttons 2a through 2c of the operating section 2, a starting signal for bringing a receiving device into a reception state, and so on, a pulse generating section 5 for generating pulses corresponding to the starting signal and operation signals stored in the memory 4, a transmitting section 6 for frequency- or amplitude-modulating a pulse train converted from the starting signal (hereinafter referred to as a starting pulse signal) or the operation signal (hereinafter referred to as an operation pulse signal) and for transmitting the pulse train to a receiving section which will be described later, a transmitting antenna 7 and a power source 8.

Figure 7:
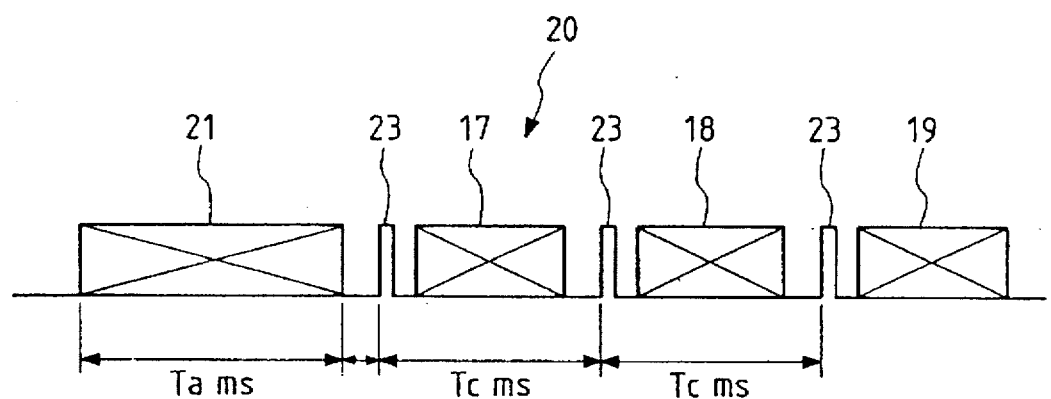
FIG. 7 illustrates the configuration of transmitting pulse data transmitted from the transmitting device.

FIG. 7 shows a transmission signal generated by the pulse generating section 5. The transmission signal 20 is composed of a starting pulse signal 21, a header pulse 23 which follows the starting pulse signal 21, and an operation pulse signal 17 which follows the header pulse 23. The operating pulse signal 17 is followed by a header pulse 23, which is in turn followed by an operation pulse signal 18 in which "1s" and "0s" are reversed from those in the operation pulse signal 17. Thereafter, a header pulse 23 and an operation pulse signal 19 having the same contents as those of the operation pulse signal 17 are generated in that order. The transmission section 6 frequency- or amplitude-modulates and transmits those pulse signals.

Figure 4:
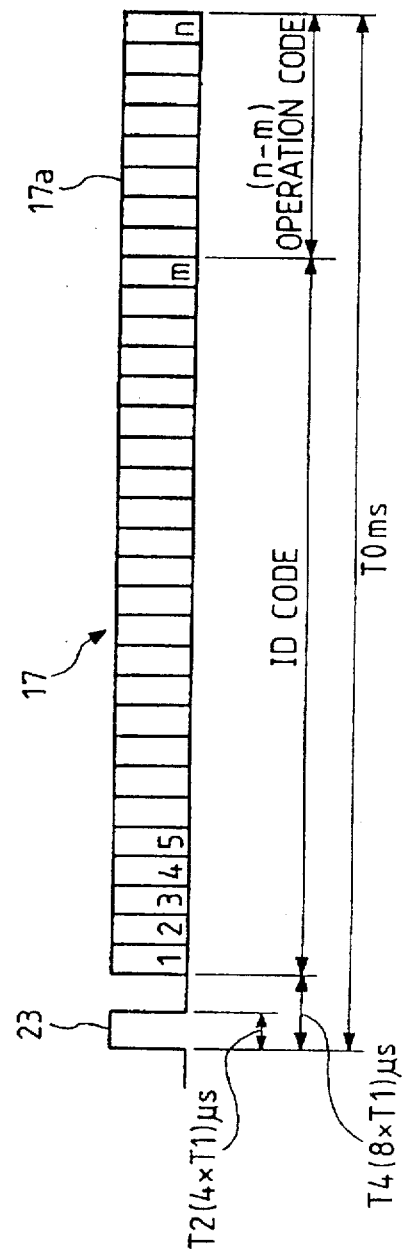
FIG. 4 illustrates an operation signal contained in a transmitting pulse signal transmitted from the transmitting device.

As shown in FIG. 4, the operation pulse signal 17 has a data length consisting of n bits. The most significant m bits of the operation pulse signal 17 form an identification (ID) code representing a correspondence between the transmitting device 1 and a receiving device which will be described below, and the least significant (n–m) bits form an operation code 17a.

The operation code 17a corresponds to the operation button 2a, 2b or 2c. In this embodiment, the operating button 2a represents the instruction of locking or unlocking the door. The operating button 2b represents the instruction of turning on or off headlights; and the operating button 2c represents the instruction of locking or unlocking a trunk compartment.

The starting pulse signal 21 shown in FIG. 7 is a series of "0s" of a binary signal, and the operation pulse signal is a pulse train represented by "0s" and "1s". In this embodiment, as shown in FIGS. 3A and 3B, the pulse train is constituted by rectangular pulses 15 and 16 having different pulse durations. The pulse 15 corresponding to "0" has a pulse duration of T1 μs, as shown in FIG. 3A, and the pulse 16 corresponding to "1" has a pulse duration of T3 (2×T1) μs which is twice the pulse duration T1 of the pulse 15. These pulses 15 and 16 representing "0" and "1" are generated by the same period T2 (4×T1) μs.

As shown in FIG. 3C, the header pulse 23 has a pulse duration T2 (4×T1) μs which is different from the pulse durations of the pulses 15 and 16. Upon receipt of the header pulse 23, the receiving device recognizes that the operation pulse signal 17 or 19 or the inverted operation pulse signal 18 will follow it.

Figure 5:
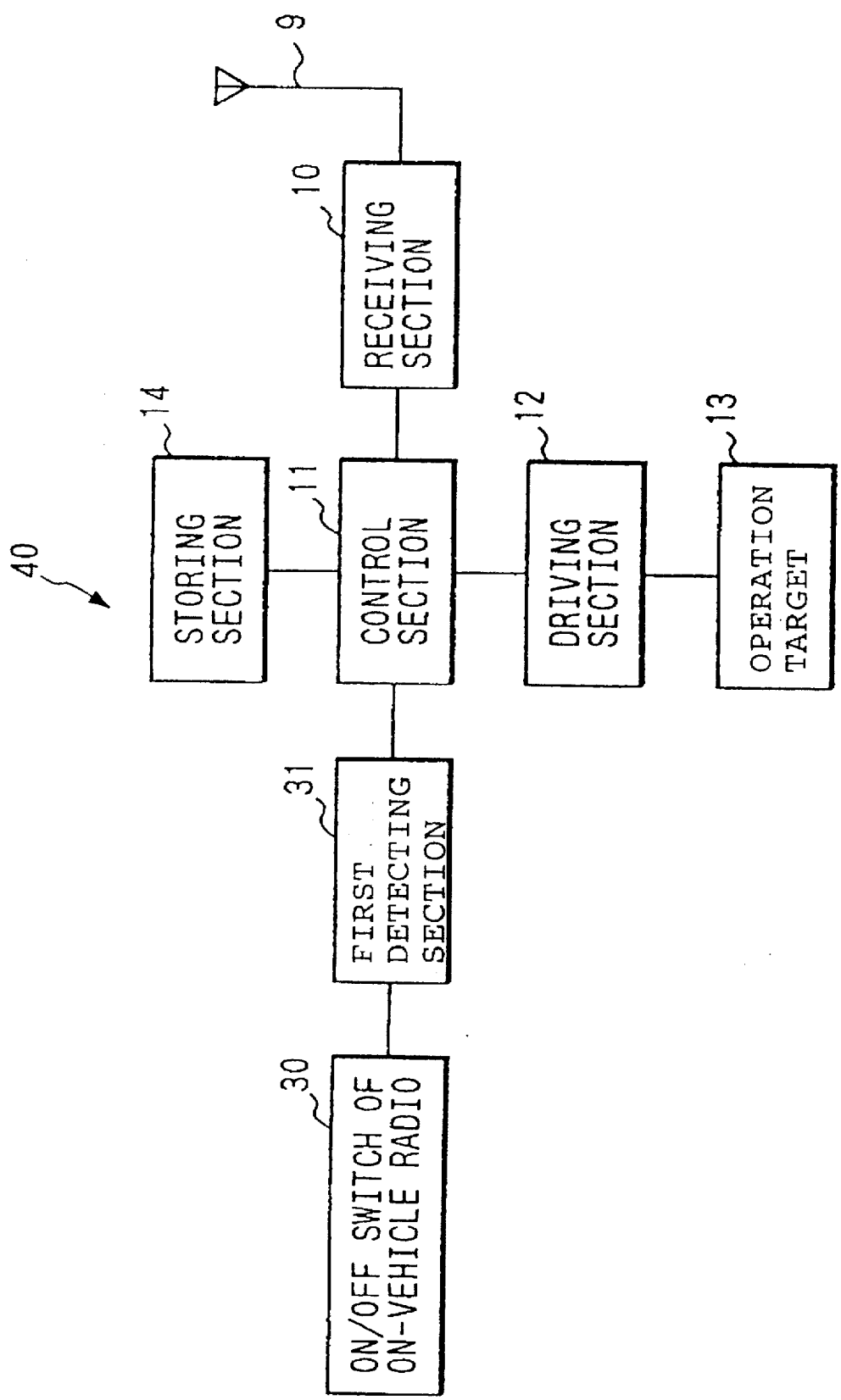
FIG. 5 illustrates the circuit configuration of a receiving device mounted on the vehicle.
Figure 6:
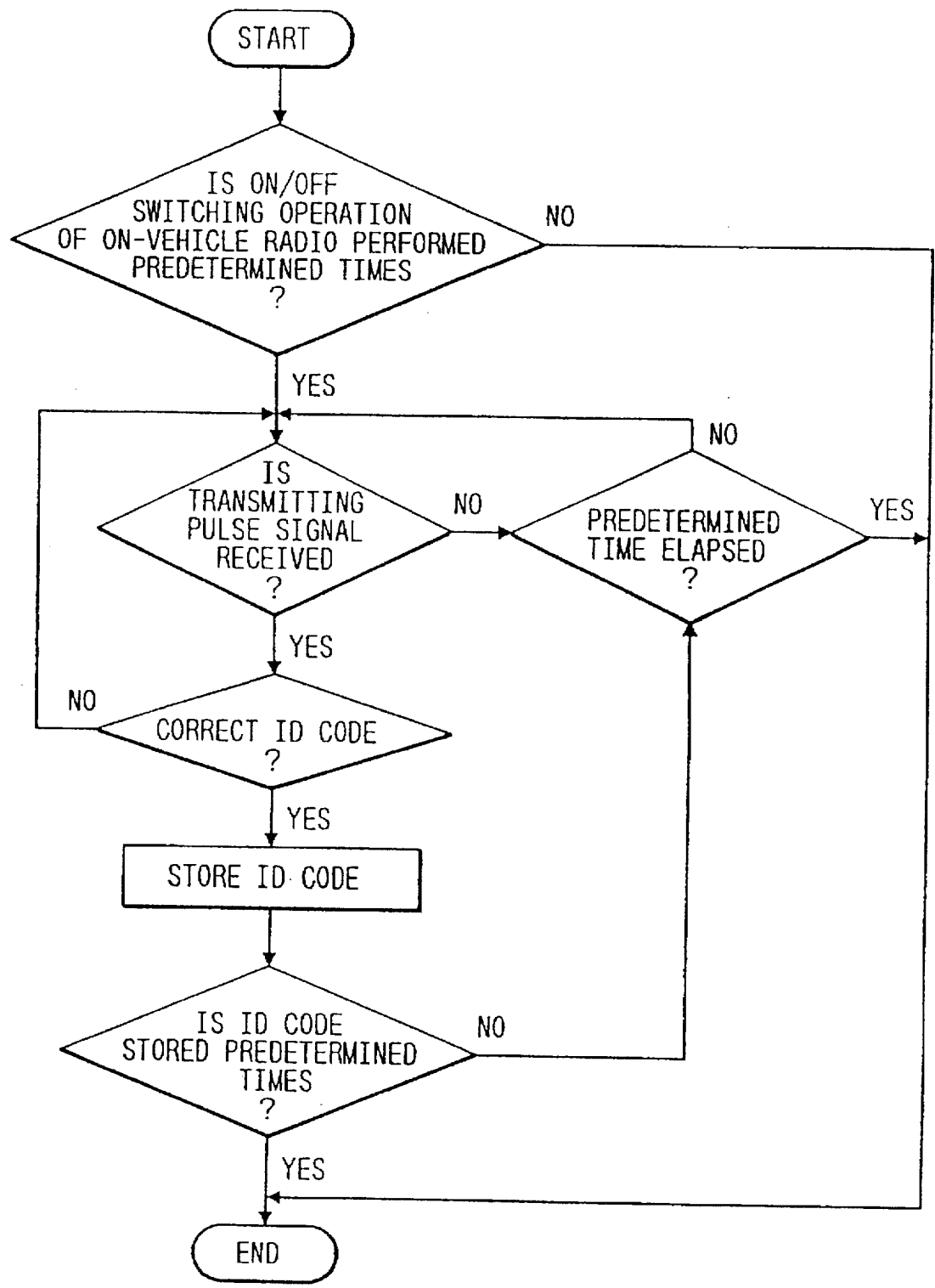
FIG. 6 is a flowchart showing the operation of the receiving device of FIG. 5.

The thus-arranged signals transmitted from the transmitting device are received by a receiving device 40 having the structure shown in FIG. 5.

The receiving device 40 includes a receiving antenna 9, a receiving section 10 for converting the signal which has been frequency- or amplitude-modulated and transmitted from the transmitting device 1 into an intermediate frequency for demodulation, a control section 11 primarily composed of a CPU (central processing unit) for performing control over the receiving device 40 and for generating a driving signal on the basis of the received signals, a driving section 12 for driving an operation target section on the basis of the driving signal output from the control section 11, an operation target 13, such as a door locking mechanism, driven by the driving section 12, and a storing section 14, such as a RAM (random access memory) or an EEPROM (electrically erasable and programmable read-only memory), for storing an ID code representing a correspondence between the transmitting device 1 and the receiving device 40, and so on.

The control section 11 is constructed such that the processing mode thereof is modified when the user operates one of various operation switches provided in a vehicle in a predetermined manner. In the embodiment shown in FIG. 5, an ON/OFF switch 30 of an on-vehicle radio is used as that various operation switch. To accomplish this modification, a first detecting section 31 for detecting that the switch 30 has been operated at a predetermined timing is provided in the receiving device 40.

The control section 11 has a function for erasing the IC code previously stored in the storing section 14 and for writing a new ID code received from the receiving section 10 at the same address when the detecting section 31 detects that the ON/OFF switch 30 has been operated in a manner different from a normal operation, i.e., that the ON/OFF switch 30 has been turned ON and OFF a predetermined number of times, in a predetermined period of time. This function of the control section 11 is executed by an ID code rewriting program stored in the storing section 14 and activated when the switch 30 is ON/OFF operated the predetermined number of times in the predetermined period of time.

Figure 8:
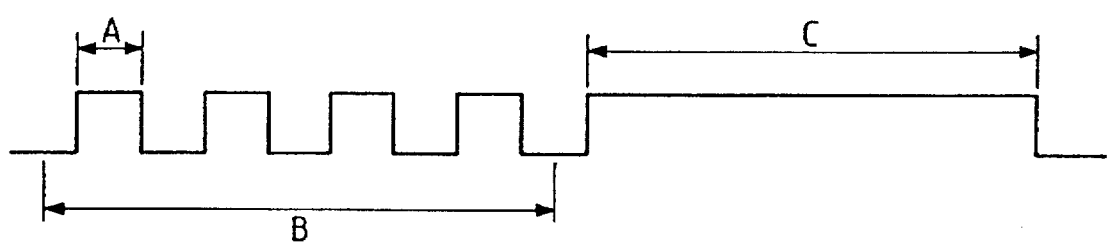
FIG. 8 is a timing chart for operating an ON/OFF switch of a vehicle radio.

The operation of the ON/OFF switch 30 may be performed in the manner shown in FIG. 8, i.e., a predetermined number of times within the entire operating time B which is 10 seconds with each ON operation time A lasting 100 msec to 1100 msec. The ID code rewriting process can be executed for only a time C in which the switch 30 is ON after the switch 30 has been operated in the above-described manner. The time C may be set in a timer.

<Processing in the Transmitting Device 1>

When the user depresses the operating button 2a of the operating section 2 of the transmitting device 1, the control section 3 and the pulse generating section 5 generate the transmission pulse signal 20 shown in FIG. 7.

The transmission pulse signal 20 shown in FIG. 7 includes the starting pulse signal 21, the header pulses 23, the operation pulse signal 17, the inverted operation pulse signal 18 which is inverted from the operation pulse signal 17, and the operation pulse signal 19 which is in turn inverted from the inverted operation pulse signal 18.

The transmitting section 6 frequency- or amplitude-modulates and transmits the transmission pulse signal 20 to the receiving device 40.

<Processing in the Receiving Device 40>

Prior to the reception of the starting pulse signal 21 contained in the transmission pulse signal 20, the receiving device 40 is in a reception waiting state in which it receives the starting pulse signal 21 intermittently with a single receiving time lasting for a given period of time.

When the starting pulse signal 21 is received by the receiving device 40 in that waiting state, the waiting state is maintained until the header pulse 23 is received. When the header pulse 23 is received by the receiving section 10 in the waiting state, the waiting state is changed into a processing waiting state in which the receiving device 40 waits for processing of, for example, the operation pulse signal 17. When the operation pulse signal 17 is received by the receiving section 10 in the processing waiting state, the signal 17 is demodulated and decoded, and the control section 11 compares the ID code (see FIG. 4) contained in the operation pulse signal 17 of the transmission signal with the ID code stored in the storing section 14. If both the ID codes are identical with each other, the control section 11 outputs, to the driving section 12, a driving command in accordance with the contents of the data in the operation code. The driving section 12 drives the operation target 12, such as a door locking mechanism. If both the ID codes are not identical with each other, the above operation corresponding to the operation code is not carried out.

When the ID code stored in the memory 4 of the transmitting device 1 becomes identical with the ID code stored in the storing section 14 of the receiving device 40, such transmitting device 1 and receiving device 40 in combination constitute a transmitting and receiving apparatus (remote operation apparatus) according to the present invention.

When the user loses, for example, the transmitting device, he obtains a new transmitting device 1. In that case, the ID code stored in the storing section 14 of the receiving device 40 must be rewritten so that it becomes identical with the ID code stored in that new transmitting device 1. The ID code rewriting operation will now be described with reference to FIG. 6.

Assuming that the door of the vehicle is in a locked state, the user gets ready to depress the radio switch for the vehicle by unlocking the door using a key.

The user repeats turning on and off of the ON/OFF switch 30 of the on-vehicle radio a predetermined number of times (e.g., 10 times) in a predetermined period of time B in such a manner that each ON operated time continues in a predetermined period of time A. When the switch operation is performed the predetermined number of times or more, the ID code rewriting program stored in the storage section 14 is activated. The activation of the program is confirmed by the locking/unlocking of the door for the vehicle. A buzzer mounted in the vehicle may be used for confirmation. It is arranged such that the continuous ON/OFF operation of the switch 30 is not performed in a usual operation of the on-vehicle radio.

When the above ON/OFF operation of the switch 30 under the conditions shown in FIG. 8 is detected by the detecting section 31, the control section 11 enters the ID code rewriting mode to enable rewriting in the receiving device mounted on the vehicle. This rewriting mode continues for a time C in which the switch 30 remains ON or for a time C set by a timer. The user depresses one of the operating buttons 2a through 2c in the new transmitting device 1 within the time C.

Consequently, the door of the vehicle locks or unlocks, whereby it can be confirmed that the receiving device has received the transmission pulse signal transmitted by the depression of the operating button.

Where the operating button is depressed after the time C has passed, the ID code rewriting program ends without rewriting. In a case where there is a transmission pulse signal reception error within the time C, rewriting becomes enabled by operating the operating button again.

When the signal shown in FIG. 7 is received by the receiving device, the control section 11 of the receiving device reads the ID code (see FIG. 4) in the received signal.

It is determined in the storing section 14 whether the received ID code is correct or not. If it is determined that the received ID code is correct, the ID code stored in the storing section 14 is replaced with the newly received ID code.

The rewritten ID code is stored in the storing section 14 a predetermined period of time by the operation of the operating button.

Thereafter, when the user turns off the switch 30 or when the time set by the timer elapses, the ID code rewriting mode ends, whereby the transmission and reception system becomes ready for transmission and reception performed using the new transmitting device 1 and new ID codes.

In the above embodiment, the repair shop, the dealer or the user who has bought the new transmitting device can reasily reset the ID code only by operating the ON/OFF switch 30 of the radio without using a personal computer or peripheral devices.

Another embodiment of the present invention will be described with reference to FIGS. 9 through 11.

Figure 9:
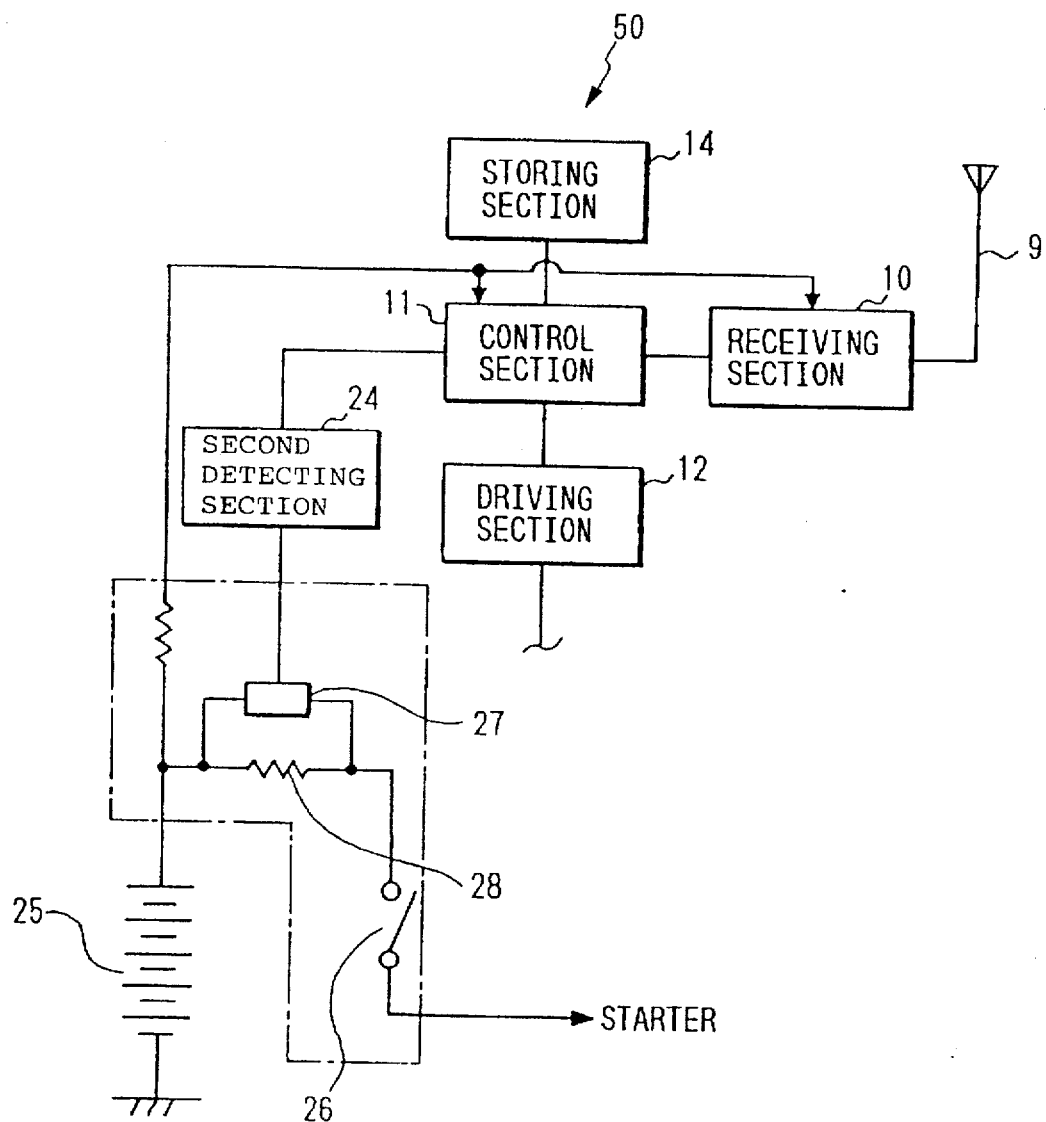
FIG. 9 is a block diagram showing the circuit configuration of a receiving device of another embodiment according to the present invention.
Figure 10:
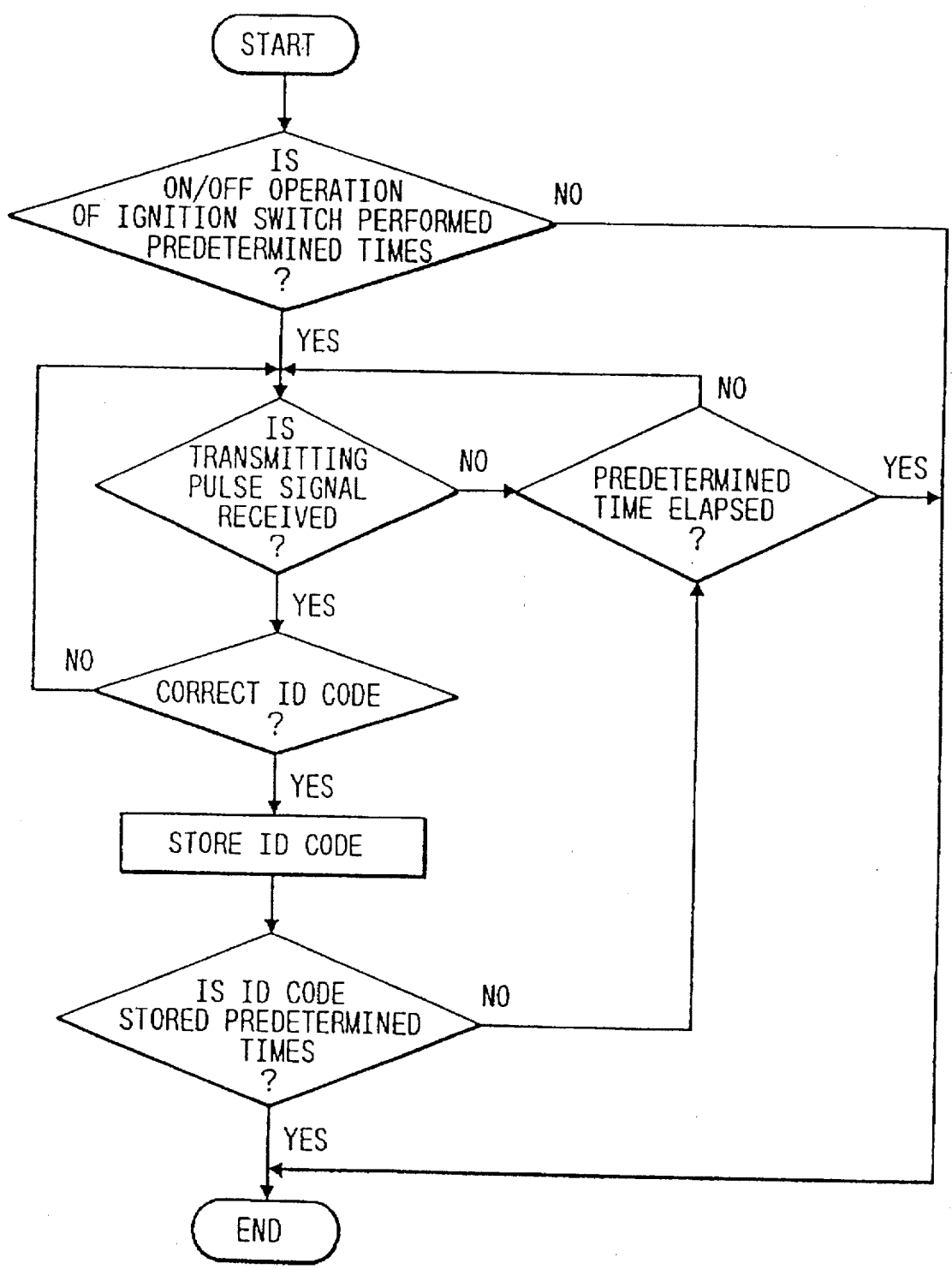
FIG. 10 is a flowchart showing the reception operation of another embodiment shown in FIG. 9.

A receiving device 50 shown in FIG. 9 includes the reception antenna 9, the receiving section 10 for converting the transmitted FM- or AM-modulated signal from the transmitting device 1 into an intermediate frequency for decoding, the control section 11 primarily composed of a CPU (central processing unit) for having control over the receiving device 50 and for generating a driving signal on the basis of the received signal, a driving section 12 for driving the operation target 13 on the basis of the driving signal output from the control section 11, the storing section 14, such as a RAM (random access memory) or a EEPROM (an electrically erasable and programmable read-only memory), for storing an ID code representing a correspondence between the transmitting device 1 and the receiving device 50, a second detecting section 24 for detecting a predetermined type of operation of the operating switch mounted on the vehicle, and a battery 25 for supplying power.

Figure 11:
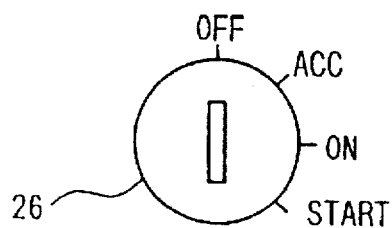
FIG. 11 illustrates an ignition switch mounted on the vehicle.

In this embodiment, an ignition switch 26 shown in FIG. 11 is used as the operating switch when the control section 11 is set in the ID rewriting mode.

The operation of the receiving device 50 shown in FIG. 9 will be described with reference to FIGS. 10 and 11.

When the user inserts the ignition switch 26 shown in FIG. 11 and turns it from an OFF state to an accessory (ACC) ON state, a current flows through a resistor 28, and a predetermined voltage is detected by a voltage detecting section 27. The user rotates the key between the OFF position and the ACC position a number of times the voltage of the voltage detecting section 27 changes, i.e., under the same conditions as those shown in FIG. 8, within a predetermined period of time. The second detecting section 24 monitors whether the accessory ON/OFF operation has been repeated. When the ON/OFF operation has been performed under the same conditions as those shown in FIG. 8, the IC code rewriting program stored in the storing section 14 is activated, and the control section 11 thereby enters the ID code rewriting mode. In this mode, the ID code previously stored in the storing section 14 of the receiving device can be rewritten by transmitting the signal from the new transmitting device with the key positioned at the accessory position.

If the ON/OFF operation of the ignition switch 26 has not been conducted under the conditions shown in FIG. 8 within a predetermined period of time, the user performs the predetermined operation of the ignition switch 26 again. The activation of the program is confirmed by the locking/unlocking of the door for the vehicle.

When the control section 11 has entered the ID code rewriting mode, the user operates either of the operating buttons 2a through 2c of the transmitting device 1. Consequently, the door of the vehicle locks or unlocks, whereby it can be confirmed that the receiving device 50 has received the transmission pulse signal transmitted by the depression of the operating button. This confirmation may also be performed using a buzzer mounted on the vehicle.

Where the operating button is depressed after the time C has passed, the ID code rewriting program ends without rewriting. In a case where there is a transmission pulse signal reception error within the time C, rewriting becomes enabled by operating the operating button again.

When the signal shown in FIG. 7 is received by the receiving device, the control section 11 of the receiving device reads the ID code (see FIG. 4) in the received signal.

It is determined in the storing section 14 whether the received ID code is correct or not. If it is determined that the received ID code is correct, the ID code stored in the storing section 14 is replaced with the newly received ID code.

When rewriting is completed, the user turns off the ignition switch 26.

In the above embodiments, the ID mode rewriting mode is entered when the radio switch or the ignition switch is operated in a way different from the normal operation. A wiper switch or a headlight switch may also be used as the above type of switch. Further, the operating conditions of the switch is not limited to those shown in FIG. 8. Any other suitable methods different from a normal operating method may be adopted.

Further, the mode in which the control section 11 is set when the switch is operated in a way different from the normal operation is not limited to the ID code rewriting mode. For example, when newly purchased transmitting device and receiving device, constituting a remote operation apparatus, are initially mounted on a vehicle, the switch operation shown in FIG. 8 may be performed to make the apparatus ready for use. Alternatively, where the user hands over a transmitting device also serving as a key holder when he parks the vehicle in a parking lot, he may set the reception disable mode by performing the switch operation shown in FIG. 8. When the transmitting device is returned, the user can reset the reception enable mode by performing the same switch operation.

In a case where the transmitting device is mounted on the vehicle, the device may be set in a transmission suspension mode or other processing modes by performing the above-mentioned switch operation.

In the present invention, the operation switch mounted on a vehicle has a function different from the normal function. The ID code rewriting mode or other modes can be set by operating that switch in a way different from the normal operation, thus facilitating the rewriting work or other setting works.

What is claimed is:

1. A transmitting and receiving apparatus for a vehicle having mode setting means, said apparatus including a transmitting device and a receiving device either of which is mounted on said vehicle, said apparatus comprising:

an electronic device mounted on said vehicle and having an operation switch, where operation of the electronic device is controlled by manual actuation of the operation switch from a first position to a second position;

a detector for detecting manual actuation of the operation switch between the first and second positions; and control means for altering a processing mode of one of said transmitting device and said receiving device in response to signals generated by the detector indicating manual actuation of the operation switch from the first position to the second position a predetermined plurality of times during a predetermined period of time.

2. A transmitting and receiving apparatus for a vehicle having mode setting means, according to claim 1, wherein said control means sets either said transmitting device or said receiving device in an identification code rewriting mode in which an identification code is rewritten when the operation switch is manually actuated from the first position to the second position the predetermined plurality of times during the predetermined period of time.

3. A transmitting and receiving apparatus for a vehicle having mode setting means, according to claim 1, wherein said operation switch comprises an on-vehicle radio switch, and wherein said control means sets either said transmitting device or said receiving device in an identification code rewriting mode when said radio switch is turned on and off the predetermined plurality of times within the predetermined period of time.

4. A transmitting and receiving apparatus for a vehicle having mode setting means, according to claim 1, wherein said operation switch comprises an ignition switch, and wherein said control means sets either said transmitting device or said receiving device in an identification code rewriting mode when a position of said ignition switch is changed from an OFF state to an accessory ON state the predetermined plurality of times within the predetermined period of time.

5. A security apparatus for a motor vehicle including a portable transmitting device and a receiving device mounted on the motor vehicle, wherein the receiving device comprises:

an electronic device mounted on said vehicle and having an operation switch, where operation of the electronic device is controlled by manual actuation of the operation switch from a first position to a second position;

a first receiving section connected to an antennae for receiving information transmitted by the portable transmitting device;

a second receiving section for detecting manual actuation of the operation switch from the first position to the second position;

a memory for storing a first identification code; and a control section connected to the first receiving section, the second receiving section and the memory;

wherein the control section rewrites the identification code when the second receiving section detects the manual actuation of the operation switch such that the operation switch is changed from the first position to the second position a predetermined plurality of times within a first predetermined time period, and the first section receives a second identification code within a second time period following a termination of the first time period.

6. A security apparatus according to claim 5 wherein the operation switch is an ON/OFF switch on a radio.

7. A security apparatus according to claim 5 wherein the operation switch is an ignition switch for turning on a motor of the vehicle.

8. A method of rewriting an identification code stored in a memory of a vehicle security system, the method comprising the steps of:
  detecting an operation a manual actuation of a switch provided for controlling an electronic device mounted on the vehicle using a first detecting means;
  activating an identification code rewriting mode of a control section after the first detecting means detects a predetermined plurality of switching operations within a first predetermined period;
  detecting the transmission of a new identification code from a transmitting device;
  rewriting the identification code stored in the memory of the securing system with the new identification code only if the transmission is detected within a second period of time following the first period of time.

* * * * *

UNITED STATES PATENT AND TRADEMARK OFFICE
CERTIFICATE OF CORRECTION

PATENT NO.    : 5,677,680
DATED         : October 14, 1997
INVENTOR(S)   : Kiyoshi Yoda It is certified that error appears in the above-indentified patent and that said Letters Patent is hereby corrected as shown below:

In Claim 8, line 4, after "operation" insert --of--.

Signed and Sealed this

Sixth Day of April, 1999

Attest:

Q. TODD DICKINSON

Attesting Officer        Acting Commissioner of Patents and Trademarks